United States Patent
Chandrasekaran et al.

(10) Patent No.: US 8,010,494 B2
(45) Date of Patent: Aug. 30, 2011

(54) METHODS TO DEFEND AGAINST TAMPERING OF AUDIT RECORDS

(75) Inventors: Sashikanth Chandrasekaran, San Jose, CA (US); Viresh Garg, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 422 days.

(21) Appl. No.: 12/024,257

(22) Filed: Feb. 1, 2008

(65) Prior Publication Data

US 2009/0199301 A1  Aug. 6, 2009

(51) Int. Cl.
*G06F 17/30* (2006.01)
(52) U.S. Cl. ........................... 707/648; 707/684
(58) Field of Classification Search .................. 707/648, 707/661, 662, 667, 668, 999.102, 999.204, 707/684
See application file for complete search history.

(56) References Cited

U.S. PATENT DOCUMENTS

| | | | |
|---|---|---|---|
| 6,725,240 B1 | 4/2004 | Asad et al. | |
| 2004/0039809 A1 | 2/2004 | Ranous et al. | |
| 2004/0249676 A1 | 12/2004 | Marshall et al. | |
| 2005/0193043 A1* | 9/2005 | Hoover | 707/204 |
| 2007/0294318 A1* | 12/2007 | Arora et al. | 707/202 |
| 2008/0104407 A1 | 5/2008 | Horne et al. | |
| 2009/0196423 A1 | 8/2009 | Chandrasekaran et al. | |

OTHER PUBLICATIONS

U.S. Appl. No. 12/024,270, filed Feb. 1, 2008, Office Action mailed Nov. 17, 2010, 12 pages.
U.S. Appl. No. 12/024,270 filed Feb. 1, 2008, Notice of Allowance mailed Mar. 15, 2011, 10 pages.
Waters et al., Building an Encrypted and Searchable Audit Log, Jan. 2004, 10 pages.

* cited by examiner

*Primary Examiner* — Cheryl Lewis
(74) *Attorney, Agent, or Firm* — Kilpatrick Townsend & Stockton LLP

(57) ABSTRACT

Embodiments of the invention provide systems and methods for maintaining audit records for a database or other resource. According to one embodiment, a method for maintaining audit records for a database can comprise detecting an operation involving at least one record of the database. An audit record can be generated for the operation and the audit record can be stored in an audit table in the database. Insert operations and select operations for the audit table can be supported but other operations for the audit table can be prohibited. Additionally or alternatively, creation of more than one audit table having a same name and schema can be prevented.

27 Claims, 13 Drawing Sheets

METHODS TO DEFEND AGAINST TAMPERING OF AUDIT RECORDS

BACKGROUND OF THE INVENTION

Embodiments of the present invention relate generally to methods and systems for database security and more particularly to maintaining and detecting tampering with audit records for a database.

Applications utilizing or monitoring a database or other data store can create audit records to keep a trail of changes performed by that or other applications. For example, an application performing a database operation or monitoring operations performed by other applications can create an audit record including information such as the operation performed, the target records, tables, etc., the party or parties performing the operations, the time at which the operation was performed, etc. These audit records can be saved to create an audit trail that can later be used in forensic investigations of the system.

Ideally, such an audit trail can be infinitely long and completely tamper-proof. Unfortunately, this is not possible. First of all, infinite storage is not available and even very large storage becomes impractical at some point. Furthermore, it is not possible to tamper proof the audit records against all possible attacks. For example, even if the audit records are stored directly to a Write Once Read many (WORM) device which is stored in a secured location, an attacker who has full control of the system can tamper with the records directly at the source, for example by modifying the application. Hence, there is a need in the art for improved methods and systems for efficiently and securely storing audit records and for detecting tampering with such records when it occurs.

BRIEF SUMMARY OF THE INVENTION

Embodiments of the invention provide systems and methods for maintaining audit records for a database or other resource. According to one embodiment, a method for maintaining audit records for a database can comprise detecting an operation involving at least one record of the database. An audit record can be generated for the operation and the audit record can be stored in an audit table in the database. Insert operations and select operations for the audit table can be supported but other operations for the audit table can be prohibited. Additionally or alternatively, creation of more than one audit table having a same name and schema can be prevented.

In some implementations, the audit table can comprise a circular audit table. In such cases, storing the audit record in the audit table can further comprise determining whether the audit table is full. In response to determining the audit table is full, a plurality of records of the audit table can be archived and the archived audit records can be deleted. For example, the plurality of records can comprise a predetermined number of records such as a plurality of consecutive records including an oldest record. In another example, in response to determining the audit table is full, an oldest record in the audit table can be overwritten. In such a case, the overwritten oldest record can be maintained in a redo format in a redo log archive of the database.

According to another embodiment, a system can comprise a database adapted to maintain one or more records in one or more tables. An application can be communicatively coupled with the database. The application can be adapted to detect an operation involving at least one record of the database, generate an audit record for the operation, and store the audit record in an audit table in the database. The database can be adapted to support insert operations and select operations for the audit table but prohibit other operations for the audit table. Additionally or alternatively, the database can be adapted to prevent creation of more than one audit table having a same name and schema.

In some implementations, the audit table can comprise a circular audit table. In such cases, the database can be adapted to store the audit record in the audit table by determining whether the audit table is full. In response to determining the audit table is full, the database can archive a plurality of records of the audit table and delete the archived audit records. For example, the plurality of records can comprise a predetermined number of records such as a plurality of consecutive records including an oldest record. In another example, in response to determining the audit table is full, the database can be adapted to overwrite an oldest record in the audit table. In such a case, the database can be further adapted to maintain the overwritten oldest record in a redo format in a redo log archive.

According to yet another embodiment, a machine-readable medium can have stored thereon a series of instruction which, when executed by a processor, cause the processor to maintain audit records for a database by detecting an operation involving at least one record of the database. An audit record can be generated for the operation and the audit record can be stored in an audit table in the database. Insert operations and select operations for the audit table can be supported but other operations for the audit table can be prohibited. Additionally or alternatively, creation of more than one audit table having a same name and schema can be prevented.

In some implementations, the audit table can comprise a circular audit table. In such cases, storing the audit record in the audit table can further comprise determining whether the audit table is full. In response to determining the audit table is full, a plurality of records of the audit table can be archived and the archived audit records can be deleted. For example, the plurality of records can comprise a predetermined number of records such as a plurality of consecutive records including an oldest record. In another example, in response to determining the audit table is full, an oldest record in the audit table can be overwritten. In such a case, the overwritten oldest record can be maintained in a redo format in a redo log archive of the database.

DETAILED DESCRIPTION OF THE INVENTION

Figure 1:
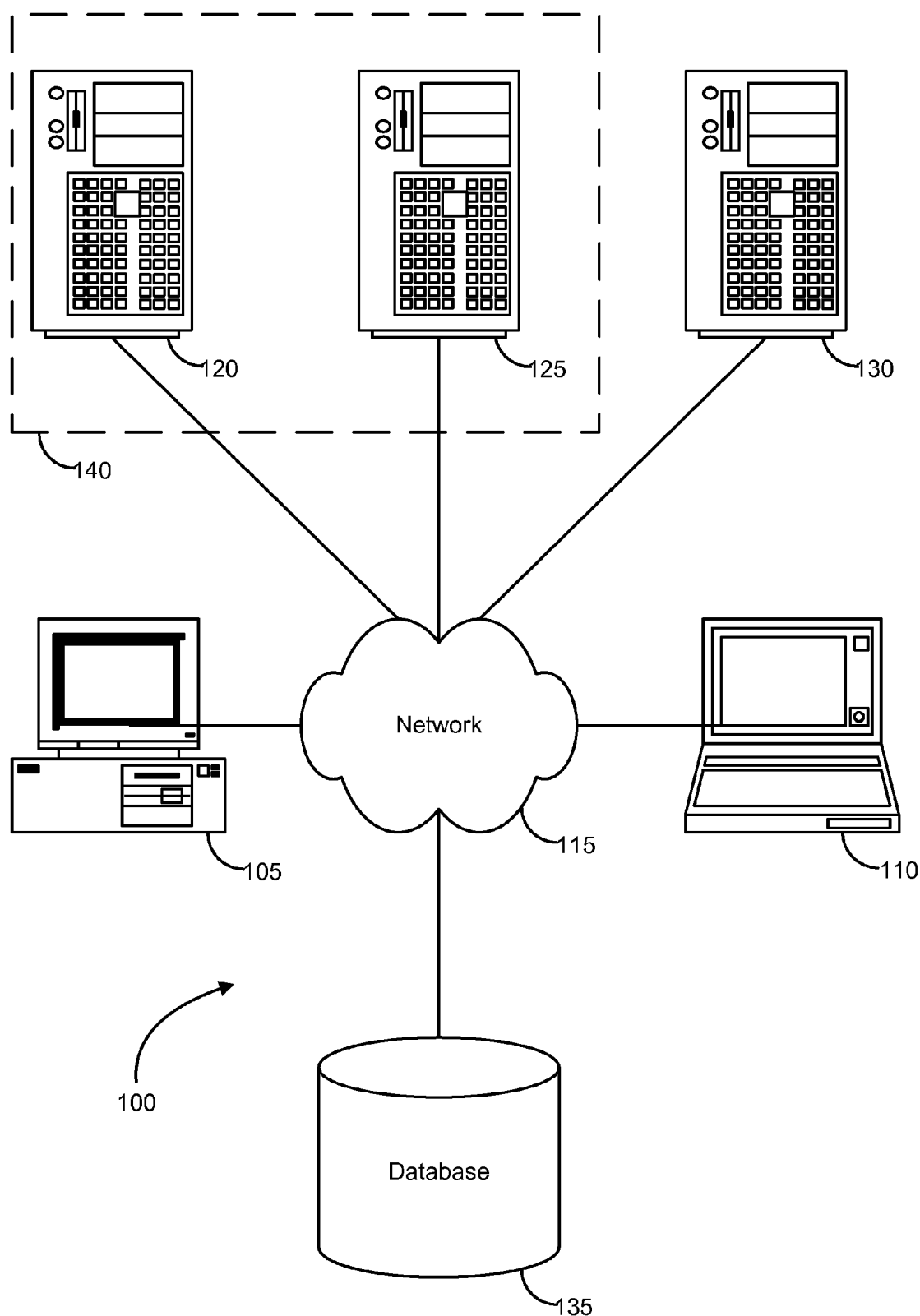
FIG. 1 is a block diagram illustrating components of an exemplary operating environment in which various embodiments of the present invention may be implemented.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination corresponds to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Embodiments of the invention provide systems and methods for maintaining audit records for a database, data store, or other resource. Generally speaking, maintaining audit records for a database can comprise detecting an operation involving at least one record of the database. An audit record can be generated for the operation and the audit record can be stored in an audit table in the database. In order to prevent an attack in which the attacker copies an original audit table, performs some malicious and/or unauthorized act, and replaces the new audit table with the original copy to cover his actions, operations on the audit table can be limited. For example, insert operations and select operations for the audit table can be supported but other operations for the audit table can be prohibited. Additionally or alternatively, creation of more than one audit table having a same name and schema can be prevented.

In order to control the size of the audit table, the audit table can be implemented as a circular table. In such cases, storing the audit record in the audit table can further comprise determining whether the audit table is full. In response to determining the audit table is full, a plurality of records of the audit table can be archived and the archived audit records can be deleted. For example, the plurality of records can comprise a predetermined number of records such as a plurality of consecutive records including an oldest record. In another example, in response to determining the audit table is full, an oldest record in the audit table can be overwritten. In such a case, the overwritten oldest record can be maintained in a redo format in a redo log archive of the database.

Embodiments of the present invention also provide systems and methods for detection of tampering with an audit record for a database, data store, or other resource. Generally speaking, detection of tampering with an audit record for a database can comprise reading one or more audit records for a time period from an audit table. The one or more audit records can each include a time stamp and reading the one or more audit records can comprise reading audit records having a timestamp within the time period. A message digest record for the time period can be generated based on the one or more audit records and including the time stamps. Generating the message digest record for the time period can comprise generating a hash value using the one or more audit records for the period and storing the hash value in the message digest record. The message digest record can be stored in a message digest table. In some cases, the message digest table can be maintained in a trusted data store.

In some cases, a set of metadata related to the one or more audit records can be maintained and used to add further security to the hash values generated. In such cases, generating the hash value using the one or more audit records can comprise generating a hash value using the one or more audit records and the related metadata. The metadata can comprise, for example, an audit record start time, an audit record end time, a message digest calculation time, a table name, a schema name, and/or other data. Additionally or alternatively, generating the message digest record for the time period can comprise storing a start time for the time period in the message digest record and storing an end time for the time period in the message digest record.

Contents of the audit table for a selected time period can be verified based on one or more entries in the message digest table spanning the selected time period. Generally speaking, verifying contents of the audit table for the selected time period can comprise fetching audit records from the audit table having time stamps between a start time of the selected time period and an end time of the selected time period. One or more message digests records can be fetched from the message digest table for the selected time period. Hash values can be calculated using the fetched audit records. The one or more hash values calculated using the fetched audit records and the hash values of the fetched one or more message digest records can then be compared to determine whether the audit records have been tampered with. Additional details of the various embodiments of the present invention will be described below with reference to the figures.

FIG. 1 is a block diagram illustrating components of an exemplary operating environment in which various embodiments of the present invention may be implemented. The system 100 can include one or more user computers 105, 110, which may be used to operate a client, whether a dedicate application, web browser, etc. The user computers 105, 110 can be general purpose personal computers (including, merely by way of example, personal computers and/or laptop computers running various versions of Microsoft Corp.'s Windows and/or Apple Corp.'s Macintosh operating systems) and/or workstation computers running any of a variety of commercially-available UNIX or UNIX-like operating systems (including without limitation, the variety of GNU/Linux operating systems). These user computers 105, 110 may also have any of a variety of applications, including one or more development systems, database client and/or server applications, and web browser applications. Alternatively, the user computers 105, 110 may be any other electronic device, such as a thin-client computer, Internet-enabled mobile telephone, and/or personal digital assistant, capable of communicating via a network (e.g., the network 115 described below) and/or displaying and navigating web pages or other types of electronic documents. Although the exemplary system 100 is shown with two user computers, any number of user computers may be supported.

In some embodiments, the system 100 may also include a network 115. The network may can be any type of network familiar to those skilled in the art that can support data communications using any of a variety of commercially-available protocols, including without limitation TCP/IP, SNA, IPX, AppleTalk®, and the like. Merely by way of example, the network 115 may be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks such as GSM, GPRS, EDGE, UMTS, 3G, 2.5 G, CDMA, CDMA2000, WCDMA, EVDO etc.

The system may also include one or more server computers 120, 125, 130 which can be general purpose computers and/or specialized server computers (including, merely by way of example, PC servers, UNIX servers, mid-range servers, mainframe computers rack-mounted servers, etc.). One or more of the servers (e.g., 130) may be dedicated to running applications, such as a business application, a web server, application server, etc. Such servers may be used to process requests from user computers 105, 110. The applications can also include any number of applications for controlling access to resources of the servers 120, 125, 130.

The web server can be running an operating system including any of those discussed above, as well as any commercially-available server operating systems. The web server can also run any of a variety of server applications and/or mid-tier applications, including HTTP servers, FTP servers, CGI servers, database servers, Java™ servers, business applications, and the like. The server(s) also may be one or more computers which can be capable of executing programs or scripts in response to the user computers 105, 110. As one example, a server may execute one or more web applications. The web application may be implemented as one or more scripts or programs written in any programming language, such as Java™, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 105, 110.

In some embodiments, an application server may create web pages dynamically for displaying on an end-user (client) system. The web pages created by the web application server may be forwarded to a user computer 105 via a web server. Similarly, the web server can receive web page requests and/or input data from a user computer and can forward the web page requests and/or input data to an application and/or a database server. Those skilled in the art will recognize that the functions described with respect to various types of servers may be performed by a single server and/or a plurality of specialized servers, depending on implementation-specific needs and parameters.

The system 100 may also include one or more databases 135. The database(s) 135 may reside in a variety of locations. By way of example, a database 135 may reside on a storage medium local to (and/or resident in) one or more of the computers 105, 110, 115, 125, 130. Alternatively, it may be remote from any or all of the computers 105, 110, 115, 125, 130, and/or in communication (e.g. via the network 120) with one or more of these. In a particular set of embodiments, the database 135 may reside in a storage-area network ("SAN") familiar to those skilled in the art. Similarly, any necessary files for performing the functions attributed to the computers 105, 110, 115, 125, 130 may be stored locally on the respective computer and/or remotely, as appropriate. In one set of embodiments, the database 135 may be a relational database, such as Oracle 10g, that is adapted to store, update, and retrieve data in response to SQL-formatted commands.

Figure 2:
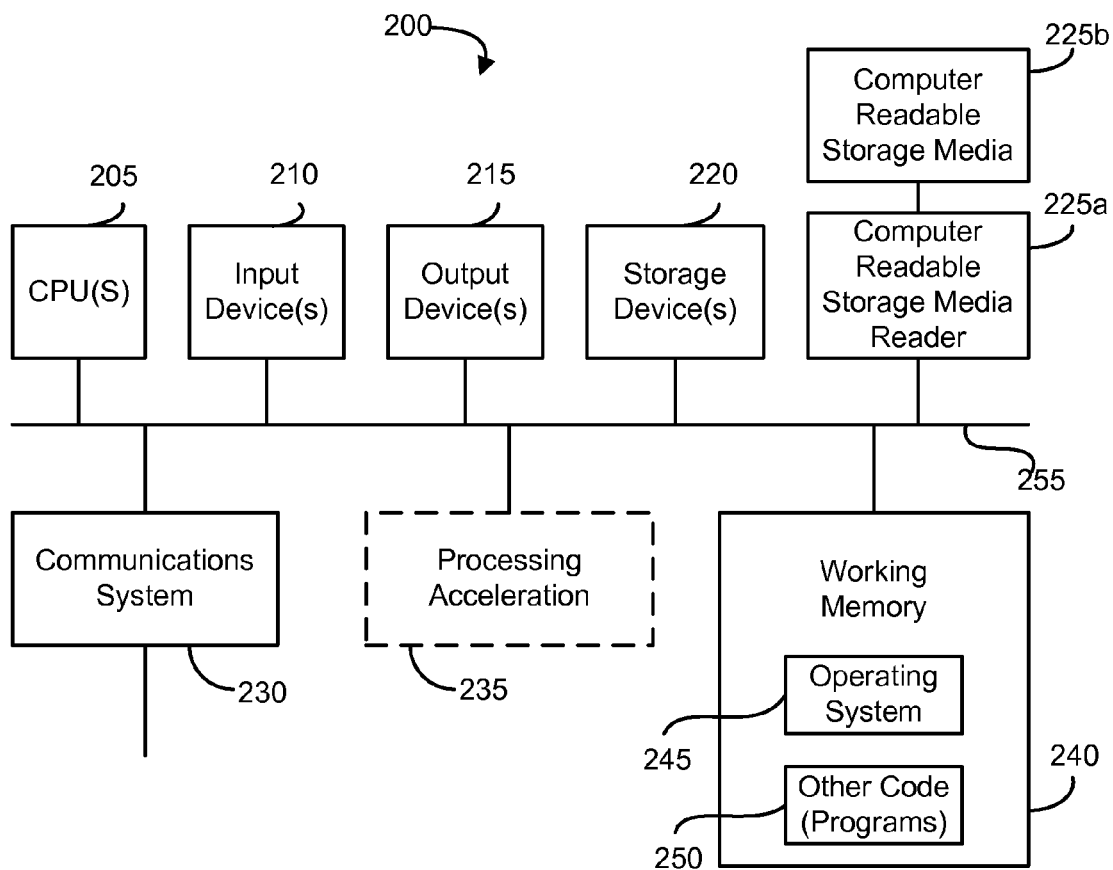
FIG. 2 is a block diagram illustrating an exemplary computer system in which embodiments of the present invention may be implemented.

FIG. 2 is a block diagram illustrating an exemplary computer system in which embodiments of the present invention may be implemented. The system 200 may be used to implement any of the computer systems described above. The computer system 200 is shown comprising hardware elements that may be electrically coupled via a bus 255. The hardware elements may include one or more central processing units (CPUs) 205, one or more input devices 210 (e.g., a mouse, a keyboard, etc.), and one or more output devices 215 (e.g., a display device, a printer, etc.). The computer system 200 may also include one or more storage device 220. By way of example, storage device(s) 220 may be disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 225a, a communications system 230 (e.g., a modem, a network card (wireless or wired), an infra-red communication device, etc.), and working memory 240, which may include RAM and ROM devices as described above. In some embodiments, the computer system 200 may also include a processing acceleration unit 235, which can include a DSP, a special-purpose processor and/or the like.

The computer-readable storage media reader 225a can further be connected to a computer-readable storage medium 225b, together (and, optionally, in combination with storage device(s) 220) comprehensively representing remote, local, fixed, and/or removable storage devices plus storage media for temporarily and/or more permanently containing computer-readable information. The communications system 230 may permit data to be exchanged with the network 220 and/or any other computer described above with respect to the system 200.

The computer system 200 may also comprise software elements, shown as being currently located within a working memory 240, including an operating system 245 and/or other code 250, such as an application program (which may be a client application, web browser, mid-tier application, RDBMS, etc.). It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed. Software of computer system 200 may include code 250 for implementing embodiments of the present invention as described herein. For example, software of computer system 200 can include code for implementing a test script as described herein for testing an application on the same or another system.

Figure 3:
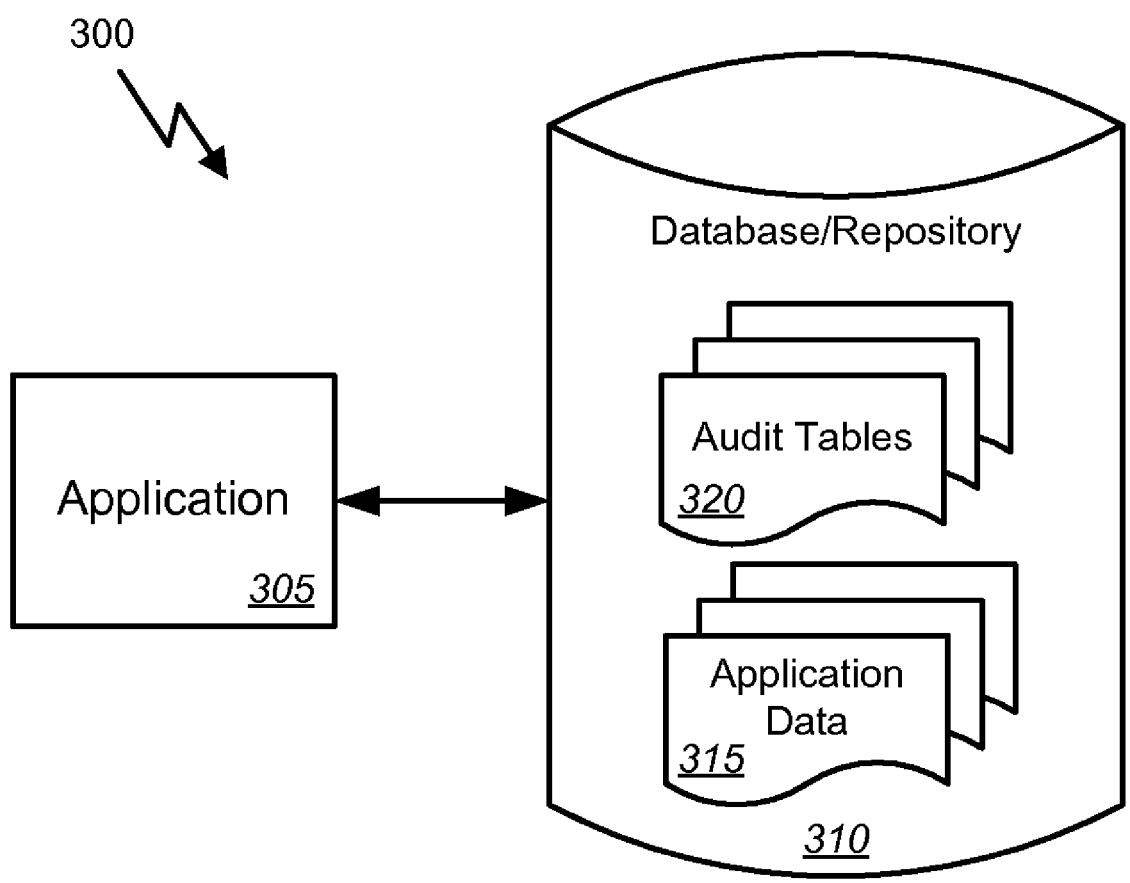
FIG. 3 is a block diagram illustrating at a high level functional components of a system for maintaining audit records for a database according to one embodiment of the present invention.

FIG. 3 is a block diagram illustrating at a high level functional components of a system for maintaining audit records for a database according to one embodiment of the present invention. In this example, the system 300 includes an application 305 and a database or repository 310. While not shown here, it should be understood that a secure and mostly reliable communication channel, e.g., via Secure Sockets Layer (SSL) or another communication link as described above, can be used to support communications between the application 305 and the database 310. The database 310 can be adapted to maintain one or more tables 315, each containing one or more records, related to data of the application 305.

The database 310 can also include one or more audit tables 320. That is, the database 310 can be enhanced to allow users to create audit tables 320 in user schemas to be populated by the application 305. Depending upon the schema used, the audit tables can include any of a variety of information such as the operation(s) performed, the target record(s) and/or table(s), the party or parties performing the operations, the time at which the operation was performed, etc. that can be valuable in the event of a problem with or intrusion of the database. Audit tables 320 can be limited by the database 310 to support only certain operations such as inserts and selects. That is, in order to prevent an attack in which the attacker copies an original audit table, performs some malicious and/or unauthorized act, and replaces the new audit table with the original copy to cover his actions, operations on the audit table can be limited by the database 310. For example, insert operations and select operations for the audit table can be supported but other operations for the audit table can be prohibited. Additionally or alternatively, creation of more than one audit table 320 having a same name and schema can be prevented. Further, the database 310 may include a system populated timestamp column in the audit tables 320 to prevent the attacker from inserting audit records with arbitrary timestamps. Additional details of contents of an exemplary audit table will described below with reference to FIG. 8.

In use, maintaining audit records for a database can comprise detecting an operation involving at least one record of the database 310, such as the application data tables 315. An audit record can be generated for the operation and the audit record can be stored in an audit table 320 in the database 310. As will be seen, these audit records can be maintained by the database 310 in a manner that controls their size and provides for later verification of the records themselves to detect any tampering that has occurred.

Figure 4:
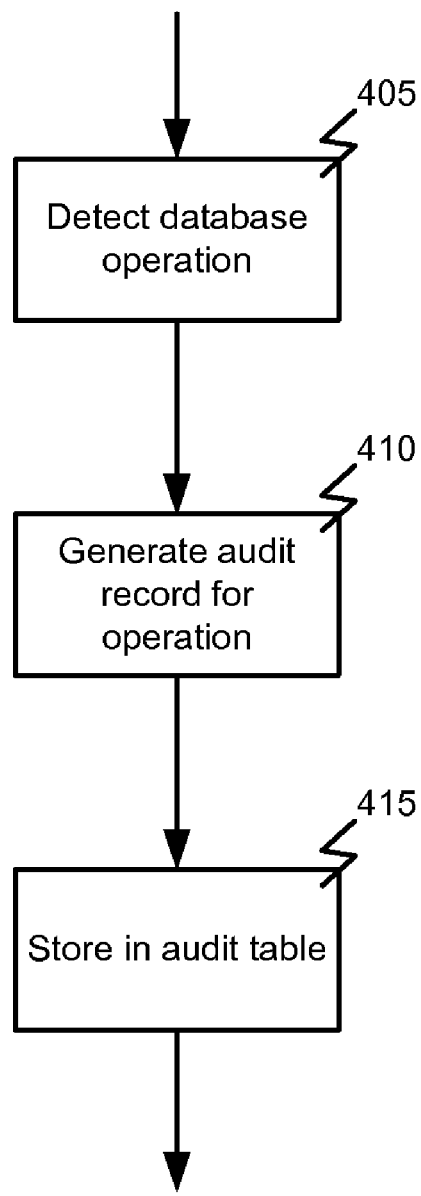
FIG. 4 is a flowchart illustrating a process for maintaining audit records for a database according to one embodiment of the present invention.

FIG. 4 is a flowchart illustrating a process for maintaining audit records for a database according to one embodiment of the present invention. In this example, the process begins with detecting 405 an operation involving at least one record of the database. For example, a query or update of the database may be performed by the application described above. Upon detection 405 of the operation, an audit record can be generated 410 for the operation. The audit record can include an of a variety of information as known in the art including but not limited to the operation(s) performed, the target record(s) and/or table(s), the party or parties performing the operations, the time at which the operation was performed, etc. and can vary depending upon the user defined schema for the audit table. Regardless of exactly what information comprises an audit record, once the record information is generated 410 the audit record can be stored 415 in an audit table in the database.

Audit tables and the verification thereof can prevent an attacker from modifying or deleting audit records. However, the application should manage the growth of the audit trail in order to prevent the volume of the audit trail from becoming a problem. As noted above, in order to control the size of the audit table, the audit table can be implemented as a circular table. The circular audit table can be implemented, for example, with archiving of aged records. In such an implementation, the user can create the audit table by specifying the space needed for online audit records and a destination for saving audit records that will be overwritten by the DBMS. For example, if the online space is set to 1 GB and the audit records have filled up 1 GB, the DBMS can copy a portion of the oldest audit records (e.g., the first 100 MB) and save it as a file in the archive destination. This portion of the audit table can thus be freed for storage of newer records. In this process, the DBMS may also apply a transformation filter to store the audit records without reference to other online data. This will allow the archived audit records to be queried independently, without referencing the database.

Figure 5:
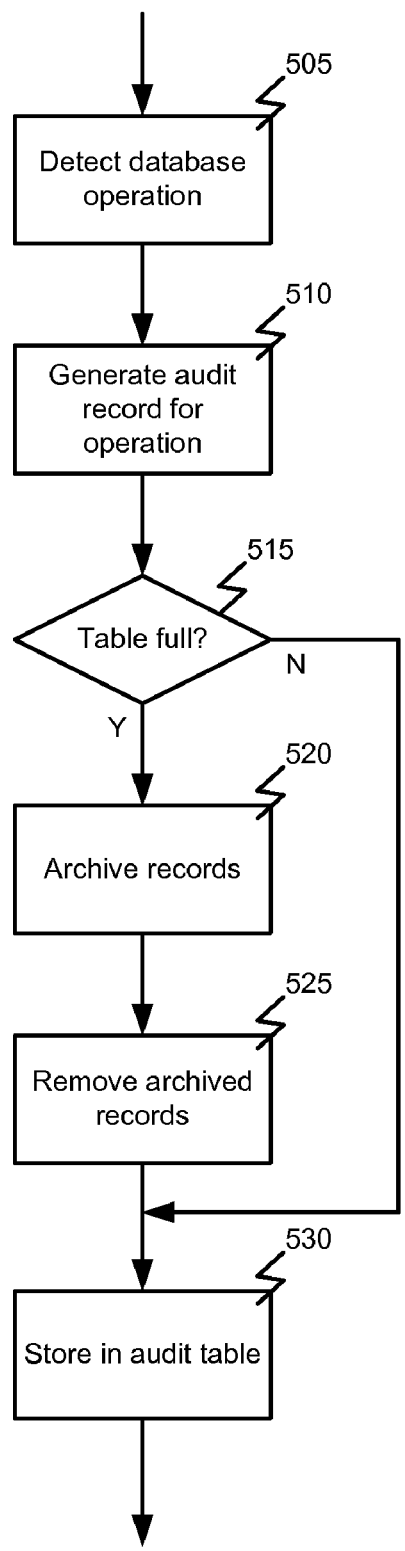
FIG. 5 is a flowchart illustrating additional details of a process for maintaining audit records for a database according to one embodiment of the present invention.

FIG. 5 is a flowchart illustrating additional details of a process for maintaining audit records for a database according to one embodiment of the present invention. In this example, as in the previous one, processing begins with detecting 505 an operation involving at least one record of the database. An audit record can be generated 510 for the operation. A determination 515 can be made as to whether the audit table is full. In response to determining 515 the audit table is full, a plurality of records of the audit table can be archived 520 and the archived audit records can be deleted 525 from the audit table. For example, the plurality of records can comprise a predetermined number of records such as a plurality of consecutive records including an oldest record. The new audit record can then be stored 530 in an audit table in the database.

According to another embodiment, the circular audit table can be implemented using redo archives. That is, typical DBMSs already have an append-only structure in the redo log. Furthermore, the DBMS already has a mechanism for archiving redo log files before they are overwritten. Thus, the DBMS can implement a circular audit table by overwriting the oldest audit records. Audit records that were inserted prior to the oldest audit record in the table are available in redo format in the redo log archives. A log miner can reconstruct the contents of these audit records. In this way, the DBMS does not need to provide a separate mechanism for archiving audit records.

Figure 6:
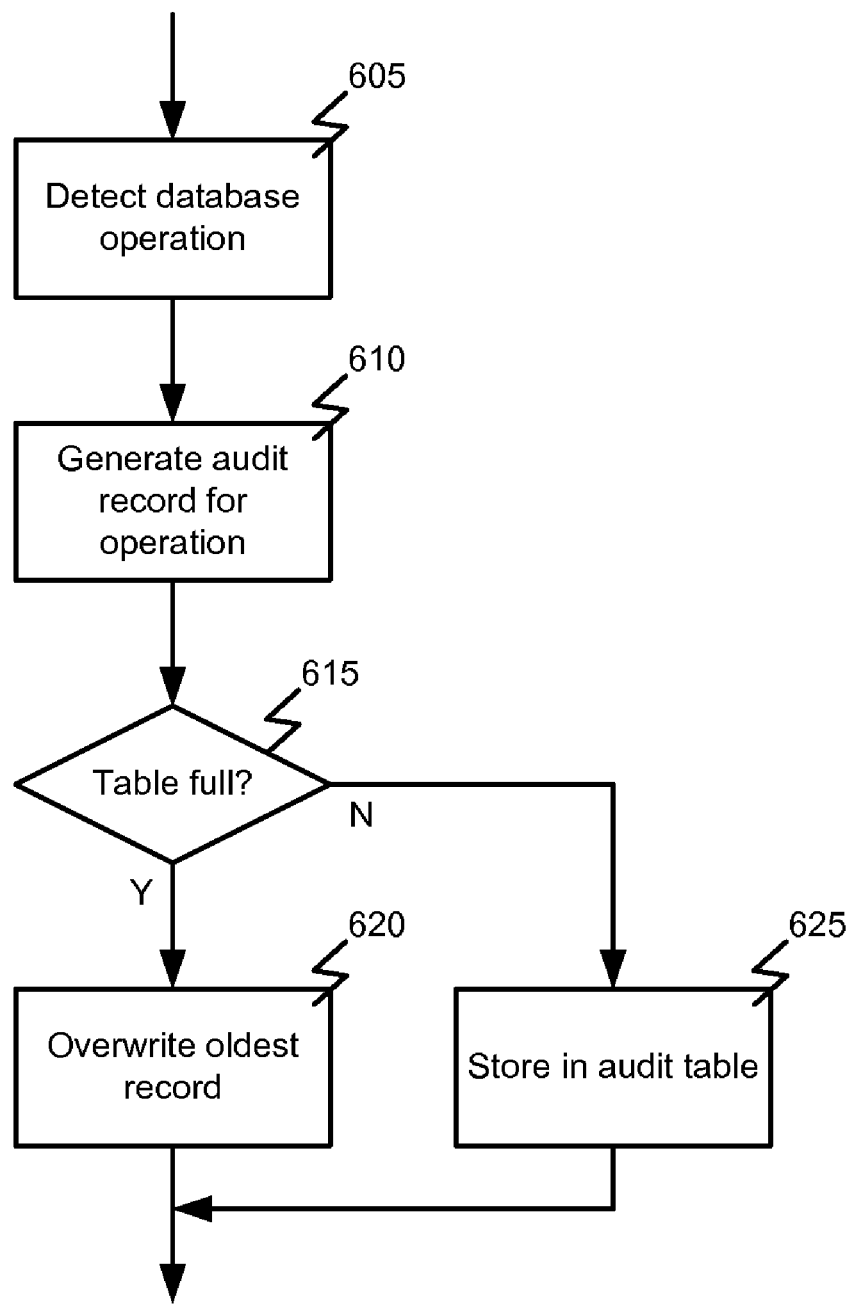
FIG. 6 is a flowchart illustrating additional details of a process for maintaining audit records for a database according to an alternative embodiment of the present invention.

FIG. 6 is a flowchart illustrating additional details of a process for maintaining audit records for a database according to an alternative embodiment of the present invention. In this example, as in the previous one, processing begins with detecting 605 an operation involving at least one record of the database. An audit record can be generated 610 for the operation. A determination 615 can be made as to whether the audit table is full. In response to determining 615 the audit table is full, an oldest record in the audit table can be overwritten 620. In such a case, the overwritten oldest record can be maintained in a redo format in a redo log archive of the database. In response to determining 615 the audit table is not full, the audit record can be stored in an audit table in the available space.

Figure 7:
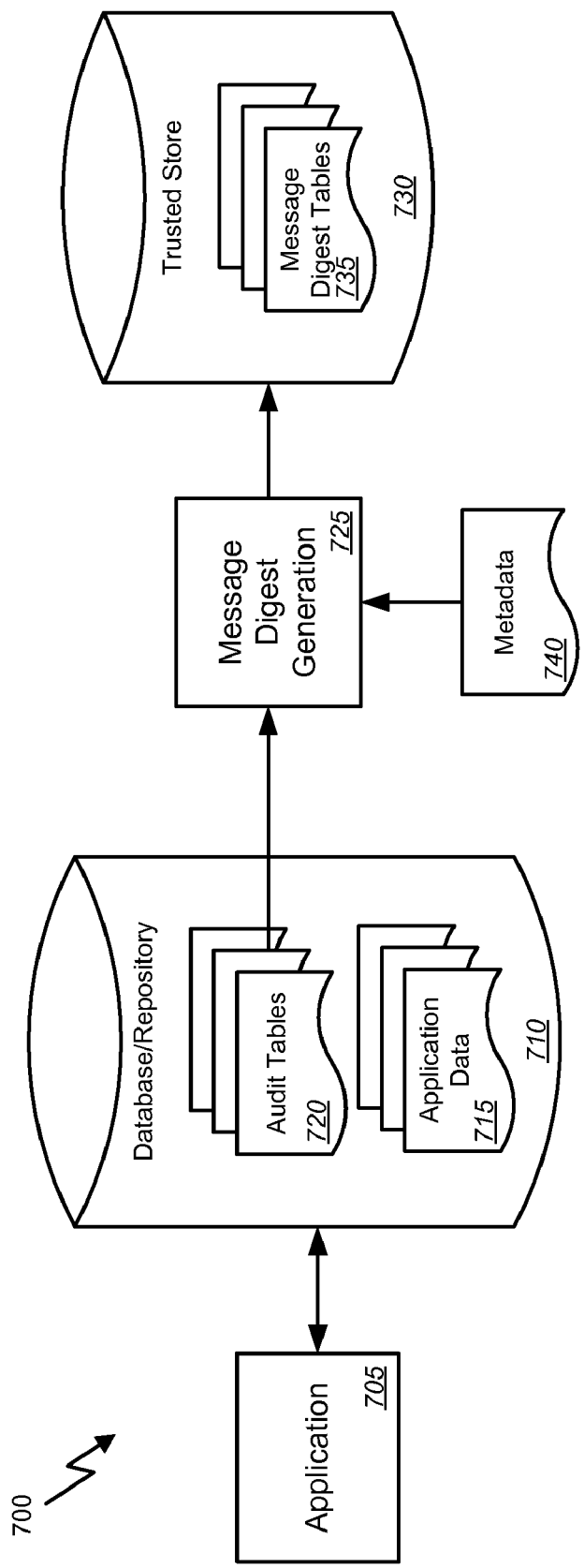
FIG. 7 is a block diagram illustrating at a high level functional components of a system for detection of tampering with an audit record according to one embodiment of the present invention.

FIG. 7 is a block diagram illustrating at a high level functional components of a system for detection of tampering with an audit record according to one embodiment of the present invention. In this example, as in the one described above with reference to FIG. 3, the system 700 includes an application 705 and a database or repository 710. While not shown here, it should be understood that a secure and mostly reliable communication channel, e.g., via Secure Sockets Layer (SSL) or another communication link as described above, can be used to support communications between the application 705 and the database 710. The database 710 can be adapted to maintain one or more tables 715, each containing one or more records, related to data of the application 705. The database 710 can also include one or more audit tables 720 as described above.

The system can also include a message digest generation application 725 or module. The message digest generation application 725 can be adapted to read one or more audit records for a time period from an audit table 720 of the database 710. For example, the message digest generation application 725 can be adapted to periodically, e.g., at specified times, at specified intervals, at random intervals, etc., read one or more records from the audit tables. As will be illustrated in FIG. 8, the one or more audit records can each include a time stamp. Therefore, reading the one or more audit records can comprise reading audit records having a timestamp within the time period. The message digest generation application 725 can also generate a message digest record for the time period based on the one or more audit records and including the time stamps. Generating the message digest record for the time period can comprise generating a hash value using the one or more audit records for the period and any of the algorithms known in the art such as Message Digest 5 (MD5) or Standard Hash Algorithm (SHA) for example. The system 700 can also include a trusted data store 730 separate from the database 710 and adapted to maintain a message digest table. In such a case, the message digest generation application 725 can be adapted to store the message digest record in the message digest table 735 of the trusted data store 730.

According to one embodiment, the message digest generation application 725 can also be adapted to read a set of metadata 740 related to the one or more audit records. The metadata 740 can comprise, for example, an audit record start time, an audit record end time, a message digest calculation time, a table name, a schema name, and/or other data. It should be noted that, while illustrated here as separate from the audit tables 720 and the database 710, the metadata 710 can alternatively be maintained in any suitable location and in any suitable format depending upon the exact implementation without departing from the scope of the present invention. Regardless of exactly how the metadata 740 is implemented, the message digest generation application 725 can be adapted to read the metadata 740 and generate the hash value using the one or more audit records and the related metadata. As will be described below with reference to FIG. 8, generating the message digest record for the time period can further comprise storing a start time for the time period in the message digest record and storing an end time for the time period in the message digest record.

Figure 8:
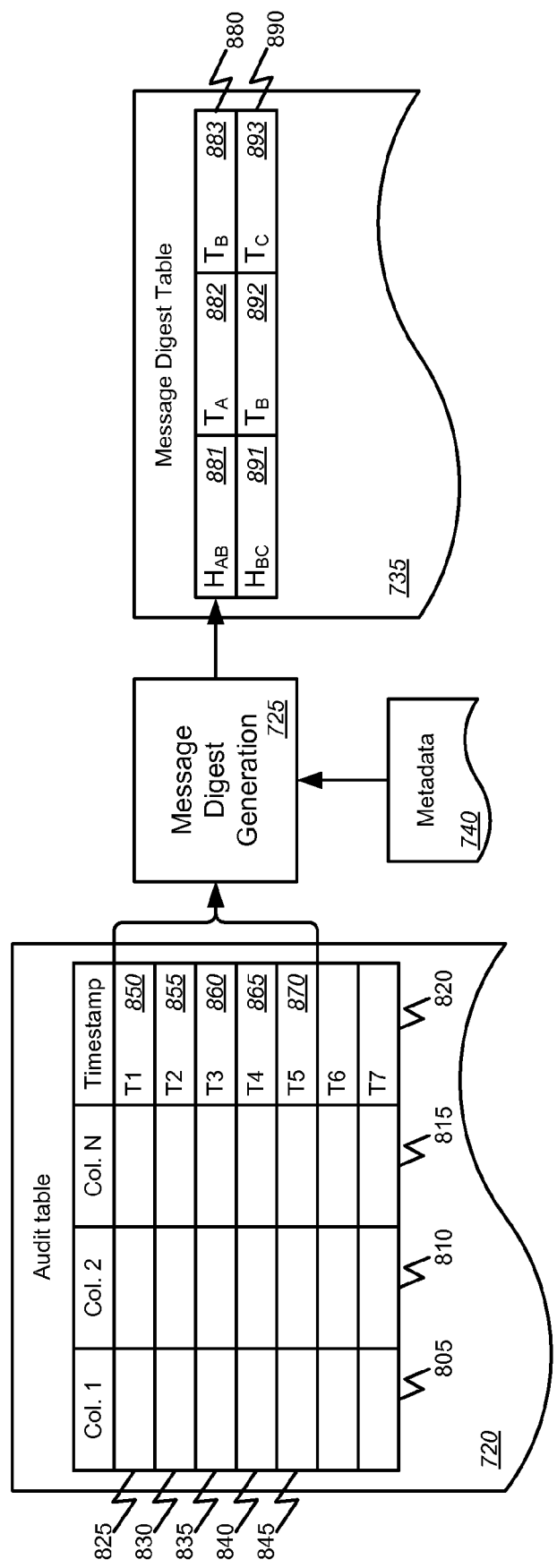
FIG. 8 is a block diagram illustrating additional details of tables utilized in the system illustrated in FIG. 7.

FIG. 8 is a block diagram illustrating additional details of tables utilized in the system illustrated in FIG. 7. This example illustrates the audit table 720, the message digest generation application 725, metadata 740, and message digest table 735. As can be seen, the audit table 720 includes a number of rows 825-845 and a number of columns 805-820 as is typical of a database table. As noted above, the size, format, content, etc. of the audit table 720 is defined by the user schema and can therefore vary significantly between implementations without departing from the scope of the present invention.

According to one embodiment of the present invention, each audit record, i.e., each row 825-845, can have a timestamp 850-870 identifying a time at which the record was generated. The timestamp 850-870 can be a wall clock time or a logical monotonically increasing number. As can be understood by one skilled in the art, these time stamps 850-870 help to provide uniqueness to the hash values generated by the message digest generation application 725. That is, as described above, the message digest generation application 725 can be adapted to read one or more audit records 825-845 for a time period, e.g., between T1 and T5. The message digest generation application 725 can generate a message digest record 880 for the time period based on the one or more audit records 825-845 and including the time stamps 850-870. Generating the message digest record 880 for the time period can comprise generating a hash value 881 using the one or more audit records for the period and any of the algorithms known in the art such as Message Digest 5 (MD5) algorithm for example. As noted above, the message digest generation application 725 can also be adapted to read a set of metadata 740 related to the one or more audit records 825-845. Thus, the message digest generation application 725 can be adapted to read the metadata 740 and generate the hash value 880 using the one or more audit records 825-845, the time stamps 850-870, and the related metadata 740. As noted above, message digest generation application 725 can generate the message digest record 880 for the time period including the hash value 881 for the audit records, a start time 882 for the time period, and an end time 883 for the period and store the record 880 in the message digest table 735. A subsequent record 890 generated by the message digest generation application 725 can also be stored in the message digest table 735. According to one embodiment and as illustrated here, the time periods for which the message digest records 880 and 890 are generated are consecutive and contiguous. Thus, the start time 892 for the subsequent message digest record 890 is equal to the end time 883 for the previous record 880.

Also, as will be described in detail below with reference to FIG. 10, the time stamps 850-870 of the audit records 825-845 and the start time 882 and 892 and end time 883 and 893 of the message digest records 880 and 890 can be used to query the message digest table 735 for message digest records when verifying the audit table. For example, contents of the audit table 720 for a selected time period, e.g., T1-T5 can be verified based on one or more entries in the message digest table 735 spanning the selected time period. Generally speaking, verifying contents of the audit table for the selected time period can comprise fetching audit records 825-845 from the audit table 720 having time stamps 850-870 between a start time of the selected time period and an end time of the selected time period. One or more message digests records 880 can be fetched from the message digest table for the selected time period based on the start time 882 and end time 883 of the record 880. Hash values can be calculated using the fetched audit records 825-845, including their time stamps 850-870 and any associated metadata 740. The one or more hash values calculated using the fetched audit records and the hash values 881 of the fetched one or more message digest records 880 can then be compared to determine whether the audit records have been tampered with. Additional details of an exemplary process for verifying the audit table 720 will be described below with reference to FIG. 10.

Figure 9:
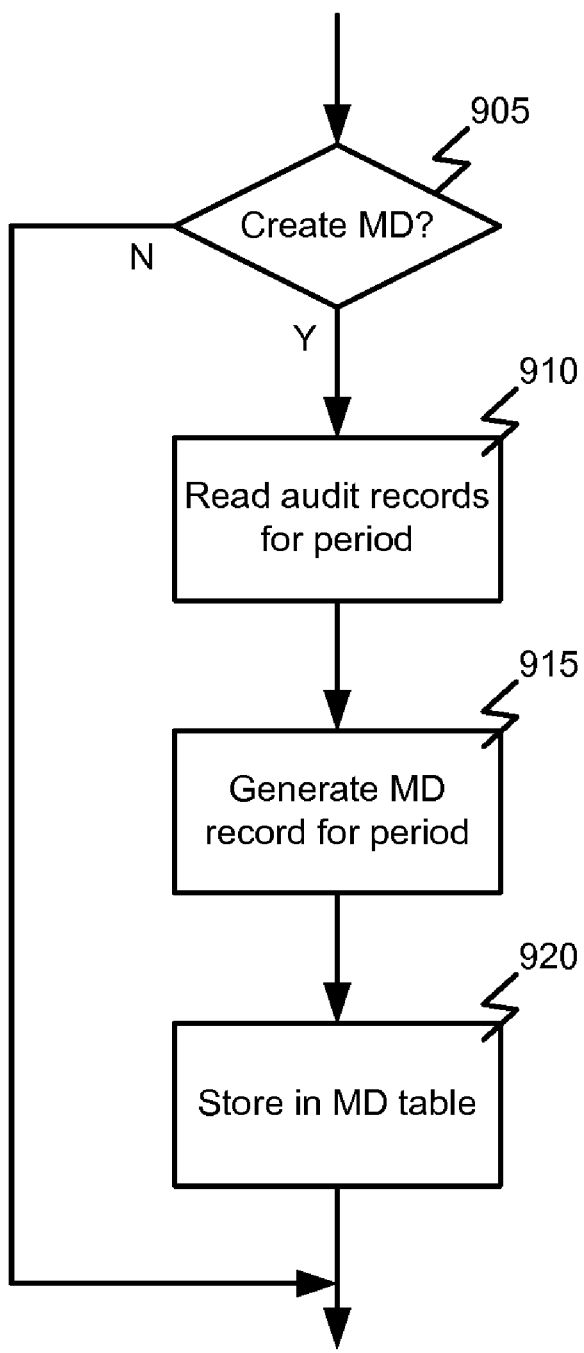
FIG. 9 is a flowchart illustrating a process for detection of tampering with an audit record according to one embodiment of the present invention.

FIG. 9 is a flowchart illustrating a process for detection of tampering with an audit record according to one embodiment of the present invention. In this example, the process begins with determining 905 whether create or generate a message digest record. As noted above, message digest record generation can be performed periodically, e.g., at specified times, at specified intervals, at random intervals, etc. In response to determining 905 to create a message digest record, one or more audit records for a time period can be read 910 from an audit table. As noted above, the one or more audit records can each include a time stamp and reading 910 the one or more audit records can comprise reading audit records having a timestamp within the time period for which the message digest record will be created. A message digest record for the time period can be generated 915 based on the one or more audit records. Generating 915 the message digest record for the time period can comprise generating a hash value using the one or more audit records for the period, including the time stamps and any associated metadata as described above and storing the hash value, a start time for the time period and an end time for the time period in the message digest record. The message digest record can be stored 920 in a message digest table.

Figure 10:
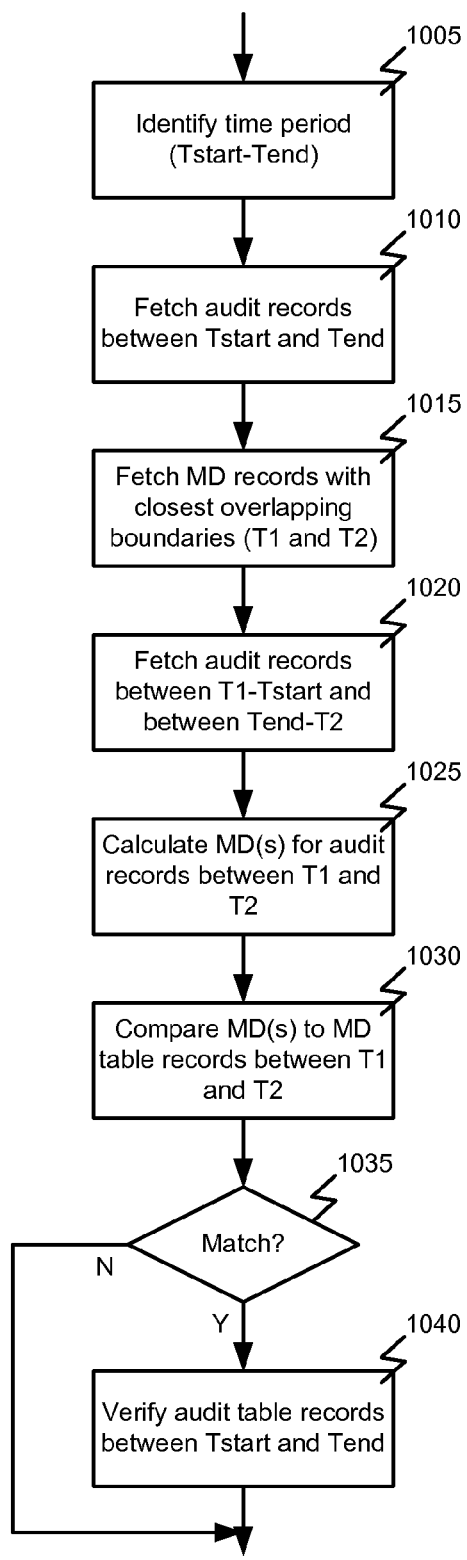
FIG. 10 is a flowchart illustrating a process for verifying contents of an audit table according to one embodiment of the present invention.

FIG. 10 is a flowchart illustrating a process for verifying contents of an audit table according to one embodiment of the present invention. As noted, the contents of the audit table for a selected time period can be verified based on one or more entries in the message digest table spanning the selected time period, for example in response to a query or request from a user, application, etc. As illustrated in FIG. 10, the process begins with identifying 1005 the start time (Tstart) and end time (Tend) of the selected time period. Audit records from the audit table having time stamps between the start time (Tstart) of the selected time period and an end time (Tend) of the selected time period can be fetched 1010 or read from the audit table. One or more message digests records can be fetched 1015 from the message digest table. The fetched message digest records can overlap the selected time period based on the start time and end time (Tstart and Tend) of the selected time period and the start times and end times of the message digests records. That is, since the start and times for the selected period likely do not exactly match the start times and end times of the message digest records, message digest records can be selected that slightly overlap the selected time period. Therefore, one or more message digest records having an earlier start time (T1) occurring before the beginning of the selected period (Tstart) and a latest end time (T2) occurring after the end time of the selected period (Tend) can be fetched 1015 (i.e., T1<Tstart and Tend≧T2).

Audit records between the earliest start time of the one or more message digests records (T1) and the start time of the selected time period (Tstart) and between the end time of the selected time period (Tend) and a latest end time of the one or more message digest records (T2) can also be fetched 1020. That is, since the message digest records overlap the selected time period, additional audit records, i.e., those between T1 and Tstart and between Tend and T2, can be fetched 1020 so that the audit records checked include all of those represented by the fetched message digest records.

Once the additional audit records corresponding to the message digest records have been fetched 1020, one or more hash values can be calculated 1025 using the fetched audit records. The one or more hash values calculated 1025 using the fetched audit records and the hash values of the fetched one or more message digest records can then be compared 1030. A determination 1035 can be made as to whether the calculated hash values match the values stored in the message digest records. In response to or based on determining 1035 that the hash values match, the audit records for the selected time period can be declared as un-tampered 1040.

It should be understood that the based methods and systems described above can be expanded and/or modified for various implementations. For example, according to one embodiment, the methods and systems described above can be modified to support multiple concurrent transactions. In such an implementation, the audit table described above can be expanded to include a transaction identifier in addition to the time stamp described. Such an implementation is described below with reference to FIG. 11.

Figure 11:
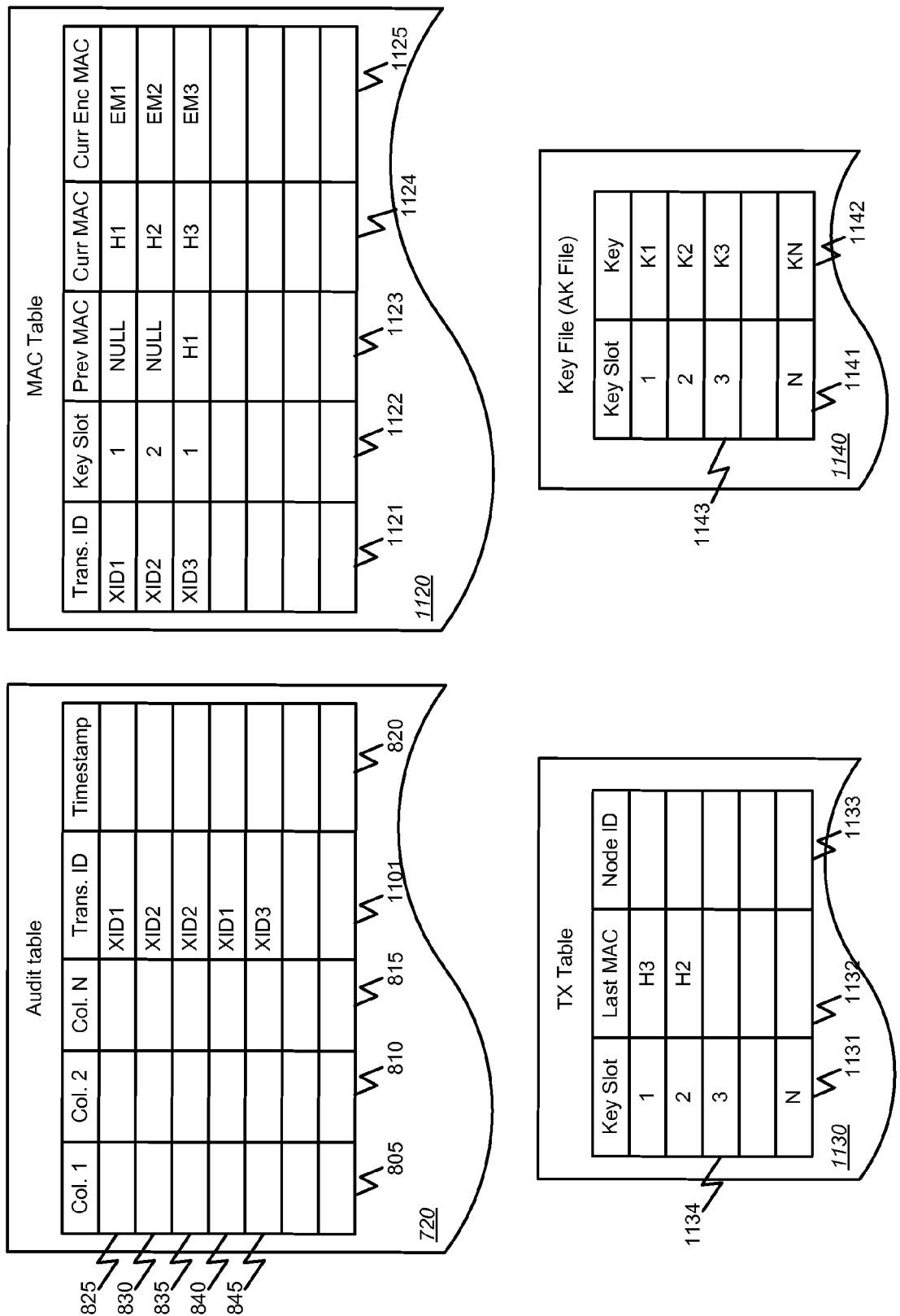
FIG. 11 is a block diagram illustrating additional details of detection of tampering with an audit record while supporting concurrent transactions according to one embodiment of the present invention.

FIG. 11 is a block diagram illustrating additional details of detection of tampering with an audit record while supporting concurrent transactions according to one embodiment of the present invention. In this example, an audit table 720 as described above can be implemented but, rather than generating a message digest table 735 as described, a Message Authentication Code table 1120 can be generated as described below to defend against tampering that may occur during the time between generation of an audit record and generation of the message digest entry. In the example illustrated here, it can be assumed that N number of concurrent transactions can be supported by the application/DBMS. A Message Authentication Code (MAC) can be computed using a per-transaction secret authentication key. At any time, there can be N secret authentication keys. According to one embodiment, the audit record is not masked. Rather, the DBMS access control can be used to enforce permissions. If the DBMS access control is compromised, it will only allow the attacker to read the audit records. If the audit records are modified, the tampering can be detected as described herein. Additionally, the audit records need not be encrypted. Rather, the authentication keys for the message authentication code can be maintained as a secret as described below.

When the application creates its schema in the DBMS, it can pick N random secret authentication keys 1142. Initially, these keys 1142 may be identical but they should become different if transactions commit at different rates. The N keys 1142 can be stored in trusted storage, in the application's volatile memory and in an OS file. For keys 1142 stored in the application's volatile memory, when the application is secure (i.e. not compromised) the attacker will not be able to read these keys 1142. If the attacker compromises the application and reads these keys 1142, the attacker can generate arbitrary audit records. However, the attacker will be unable to tamper audit records generated before the attack without evading detection. For keys 1142 stored as N encrypted rows in a key-file 1140 (referred to hereafter as the AK-file) that is external to the DBMS, i.e. OS file, either the public key of the trusted storage or a secret symmetric key that the application exchanges with the trusted store during start-up can be used. Each row of this file 1140 is $E(Key, A_j)$ where E is the encryption function, Key is the public key of the trusted store or the secret symmetric key and $A_j$ is the random authentication key used by the $j^{th}$ transaction that uses a given row 1134 in the transaction table 1130 (described below). When the application needs to allow more concurrent transactions, it can use the same procedure as above—i.e. pick random keys, save them in trusted storage, encrypt the keys and save the encrypted keys as rows in the AK-file 1140.

The application can maintain a DBMS table containing N rows, i.e., the transaction table 1130, wherein each row can contain a column 1132 that stores the MAC of the audit records generated by the transaction that previously used that row. The MAC value 1132 can be saved in this table 1130 so that the next transaction that uses the same slot 1131 in the transaction table 1130 can compute its MAC value based on the MAC value 1132 of the previous transaction that used the slot 1131. This MAC chaining allows a detector to verify the transaction chain without per-transaction encryption (i.e. without verifying the authentication key chain as described below). Note that the encrypted MAC value 1132 can be saved as a per-transaction audit record at commit time. Also, the transaction table 1130 can include a Node ID column 1133 in which may be stored an identifier of a processing node or machine supporting the transaction. The transaction chain can also be verified by encrypting the per-transaction MAC with the secret key $A_j$. Since $A_j$ is derived from the secret key $A_{j-1}$, a break in the transaction chain can be detected, but this verification uses an encryption operation for each transaction.

For example, for a first audit record generated by a transaction, the transaction can scan the transaction table and lock a row that is not locked by another concurrently executing transaction. If the transaction locked row #3 1134, it retrieves secret key #3 1143 from the AK file 1140. For example, the secret key 1143 can be $A_j$, i.e. j transactions have used row #3. The application can then apply a one-way cryptographic hash to compute a new secret authentication key for the current transaction. For example, the one-way hash function could be '$A_{j+1}$=Hash("Increment Hash", $A_j$)'. The application can update row #3 in the AK-file 1140 with the result of the encryption of the authentication key of this transaction using either the public key of the trusted storage or a secret symmetric key. This update can be flushed to the AK-file 1140 just before the transaction commits. The update overwrites the encrypted value of the authentication key used by the previous transaction that locked row #3. If the AK-file 1140 is tampered with, the tampering can be detected because the modified value will not match the result of the hash function when the hash function is applied starting from the initial value of the authentication key that is saved in the trusted storage.

Each transaction can also insert an entry into a MAC table 1120. The MAC table 1120 can contain a transaction ID 1121, a key slot 1122 used by each transaction, the current MAC 1124 of the audit records generated in the transaction, the MAC 1123 of the audit records generated by the previous transaction that used the same slot 1122, and the encrypted MAC 1125 of the audit records generated in the transaction. As explained above, the MAC values 1123 and 1124 allow for verification of the transaction chain without per-transaction encryption where a transaction computes a current MAC 1124 based on the MAC 1123 of the previous transaction in the chain. The MAC table 1120 is an adjunct to the audit table 720 that groups the rows of the audit table by transaction id 1101. The slot 1122 in the MAC table 1120 can be recorded so that the verifier can traverse the N chains, where each chain consists of a sequence of transactions. Note that, in some implementations, only the encrypted MAC 1125 for the last transaction that used the slot may be recorded (i.e. one encrypted MAC per slot, rather than an encrypted MAC per transaction) and the single encrypted MAC 1132 can be saved in the transaction table 1130. However, the per-transaction encrypted MAC 1125 in the MAC table 1120 allows a verifier to check the integrity of audit records created in a single transaction by processing the audit records of that transaction and encrypting the hash value of the audit records with the transaction's secret authentication key. The transaction's secret authentication key can be re-computed by determining the number of transactions that had used the same slot since the initial authentication key and re-applying the hash increment function new-secret-key=Hash("Increment Hash", previous-secret-key).

Transactions can be linked via the MACs 1123-1125 or via the unlocked slot 1122 picked by the transaction. Each transaction records a final audit record in the MAC table 1120 just before transaction commit. The final audit record contains a cryptographic hash value 1124. This hash value 1124 can be computed from the contents of the audit record of the audit table 720 generated in this transaction. Additionally, to verify the transaction chain without decrypting the encrypted MAC 1125, the hash value 1132 stored in the transaction table 1130 row by the previous transaction that used the same row can be included. The final audit record of the MAC table 1120 also contains an encrypted MAC 1125 that is computed using the secret authentication key for this transaction identified by the key slot 1131 and 1141. The secret authentication key can be derived from the secret authentication key 1142 that was used by the previous transaction that picked this slot using the one way hash increment function new-secret-key=Hash("Increment Hash", previous-secret-key). Logically, all the audit records generated by a transaction correspond to a single commit audit record.

In summary, the per-transaction authenticated MAC prevents the attacker from deleting, modifying or inserting audit records within a transaction. The transaction MAC chain and the authentication key chain prevent the attacker from deleting entire transactions or inserting new transactions. The authentication key chain can verify the integrity of audit records by storing just the initial secret authentication keys in trusted storage. The AK-file, which is a nonvolatile store outside the DBMS, prevents the attacker from truncating the audit record trail and speeds up application restart. Starting with the initial secret keys stored in the trusted store and following the N chains, where each chain is a sequence of transactions, the integrity of the audit trail can be verified. The verification can be performed in parallel by N threads. The skew among the lengths of the N trails can be minimized by picking an unlocked row at random. Periodic tamper detection can be performed and the intermediate authentication keys for each of the N threads can be saved in trusted storage. If a transaction's MAC is used for computing the MAC for the next transaction that uses the same slot, the intermediate MAC values can be saved. A subsequent verification procedure can start from these intermediate values rather than the initial secret keys.

Figure 12:
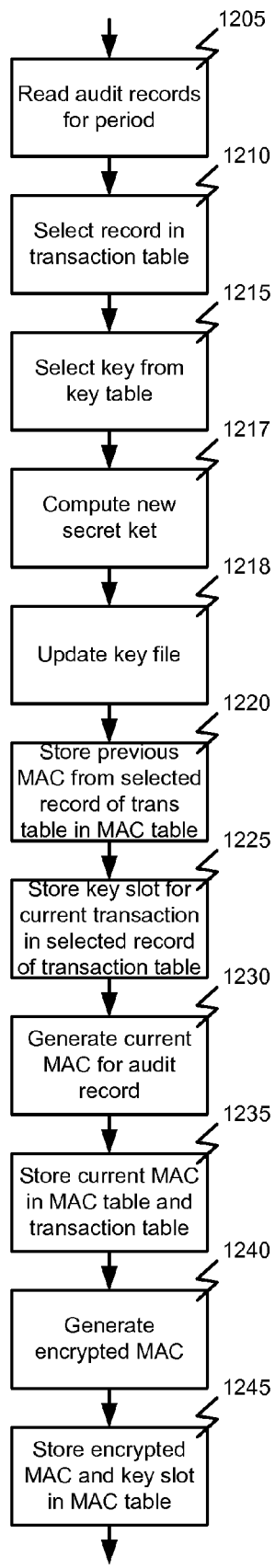
FIG. 12 is a flowchart illustrating a process for generating audit records that can facilitate the detection of tampering according to an alternative embodiment of the present invention.

FIG. 12 is a flowchart illustrating a process for generating audit records that can facilitate the detection of tampering according to an alternative embodiment of the present invention. More specifically, this example illustrates a process that may be used to implement the tables described above with reference to FIG. 11. In this example, the process begins with reading 1205 one or more audit records. A record from a transaction table representing a plurality of concurrent transactions can be selected 1210.

A corresponding per-transaction secret key can be selected 1215 from a key table. A new secret key can be computed 1217 as described above. For example, a one-way cryptographic hash can be applied to compute a new secret authentication key for the current transaction. For example, the one-way hash function could be '$A_{j+1}$=Hash("Increment Hash", $A_j$)'. The key file can be updated 1218 with the result of the encryption of the authentication key of this transaction using either the public key of the trusted storage or a secret symmetric key. As noted, this update 1218 can be flushed to the key file just before the transaction commits. The update 1218 overwrites the encrypted value of the authentication key used by the previous transaction that used the same row.

A previous Message Authentication Code (MAC) from the selected record of the transaction table can be stored 1220 in a record of a MAC table. A key slot can also be stored 1225 in the selected record of the transaction table. The key slot can identify the selected per-transaction secret key from the key table. A current MAC can be generated 1230 for the audit record and stored 1235 in the record of the MAC table and the selected record of the transaction table. An encrypted MAC can also be generated 1240. The encrypted MAC and key slot can be stored 1245 in the record of the MAC table.

Figure 13:
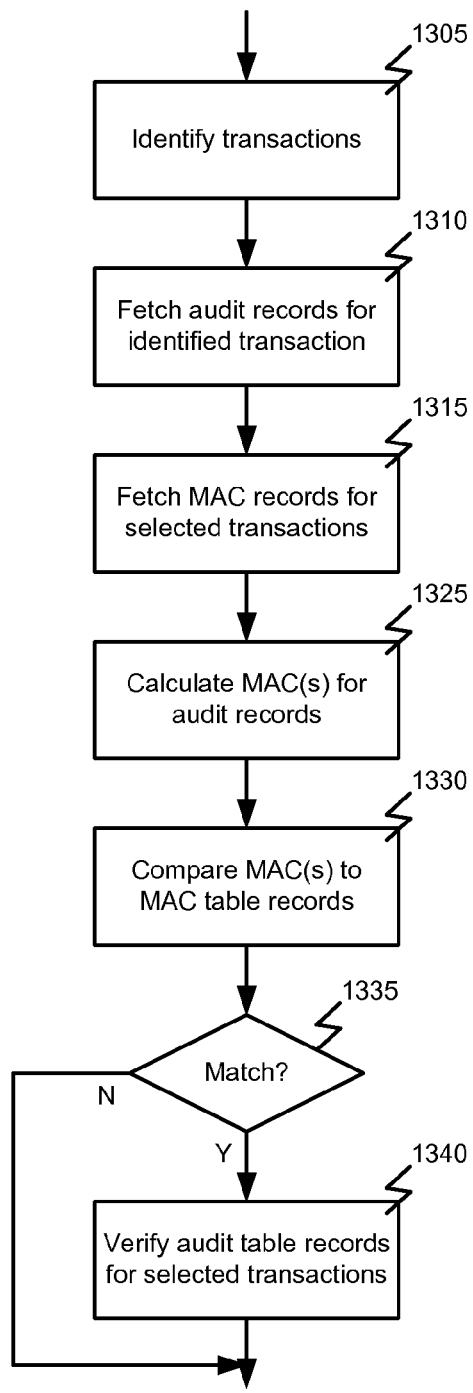
FIG. 13 is a flowchart illustrating a process for verifying contents of an audit table according to an alternative embodiment of the present invention.

FIG. 13 is a flowchart illustrating a process for verifying contents of an audit table according to one embodiment of the present invention. As noted, the contents of the audit table for selected transactions can be verified based on one or more entries in the MAC table for the selected transactions, for example in response to a query or request from a user, application, etc. As illustrated in FIG. 13, the process begins with identifying 1305 the selected transactions. Audit records from the audit table having transaction identifiers of the selected transactions can be fetched 1310 or read from the audit table. One or more MAC table records for the selected transactions can be fetched 1315 from the MAC table.

One or more MACs can be calculated 1025 using the fetched audit records, i.e., using the keys identified by the key slot of the MAC records. The one or more MACs calculated 1325 using the fetched audit records and the MACs of the fetched one or more MAC records can then be compared 1330. A determination 1335 can be made as to whether the calculated MACs match the values stored in the MAC records. Determining 1335 whether the calculated MACs match the values stored in the MAC records can comprise recomputing the secret authentication key for the transaction as described above (i.e., by determining the number of transactions that had used the same slot since the initial authentication key and re-applying the hash increment function) and verifying the encrypted MAC using the recomputed secret authentication key. In response to or based on determining 1335 that the MACs match, the audit records for the selected transactions can be declared as un-tampered 1340.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method for maintaining audit records for a database, the method comprising:
    detecting an operation involving at least one record of the database;
    generating an audit record for the operation;
    storing the audit record in an audit table in the database, wherein the audit table comprises a plurality of audit records;
    generating a message digest record based on the plurality of audit records; and
    storing the message digest record in a message digest table.

2. The method of claim 1, further comprising supporting insert operations and select operations, for the audit table but prohibiting other operations for the audit table.

3. The method of claim 2, further comprising preventing creation of more than one audit table having a same name and schema.

4. The method of claim 1, wherein the audit table comprises a circular audit table.

5. The method of claim 4, wherein storing the audit record in the audit table further comprises:
    determining whether the audit table is full; and
    in response to determining the audit table is full, archiving a plurality of records of the audit table and deleting the archived audit records.

6. The method of claim 5, wherein the plurality of records comprises a predetermined number of records.

7. The method of claim 5, wherein the plurality of records comprises a plurality of consecutive records including an oldest record.

8. The method of claim 4, wherein storing the audit record in the audit table further comprises:

determining whether the audit table is full; and in response to determining the audit table is full, overwriting an oldest record in the audit table.

9. The method of claim 8, further comprising maintaining the overwritten oldest record in a redo format in a redo log archive of the database.

10. The method of claim 1, further comprising verifying contents of the audit table for a selected time period based on one or more entries in the message digest table.

11. A system comprising:

a database adapted to maintain one or more records in one or more tables;

an application communicatively coupled with the database and adapted to detect an operation involving at least one record of the database, generate an audit record for the operation, store the audit record in an audit table in the database, wherein the audit table comprises a plurality of audit records, generate a message digest record based on the plurality of audit records, store the message digest record in a message digest table, and verify contents of the audit table for a selected time period based on one or more entries in the message digest table.

12. The system of claim 11, wherein the database is adapted to support insert operations and select operations for the audit table but prohibit other operations for the audit table.

13. The system of claim 12, wherein the database is adapted to prevent creation of more than one audit table having a same name and schema.

14. The system of claim 11, wherein the audit table comprises a circular audit table.

15. The system of claim 14, wherein the database is adapted to store the audit record in the audit table by:

determining whether the audit table is full; and in response to determining the audit table is full, archiving a plurality of records of the audit table and deleting the archived audit records.

16. The system of claim 15, wherein the plurality of records comprises a predetermined number of records.

17. The system of claim 15, wherein the plurality of records comprises a plurality of consecutive records including an oldest record.

18. The system of claim 14, wherein the database is adapted to store the audit record in the audit table by:

determining whether the audit table is full; and in response to determining the audit table is full, overwriting an oldest record in the audit table.

19. The system of claim 18, wherein the database is further adapted to maintain the overwritten oldest record in a redo format in a redo log archive.

20. A machine-readable medium having stored thereon a series of instruction which, when executed by a processor, cause the processor to maintain audit records for a database by:

detecting an operation involving at least one record of the database;

generating an audit record for the operation;

storing the audit record in an audit table in the database, wherein the audit table comprises a plurality of audit records;

generating a message digest record based on the plurality of audit records;

storing the message digest record in a message digest table; and verifying contents of the audit table for a selected time period based on one or more entries in the message digest table.

21. The machine-readable medium of claim 20, further comprising supporting insert operations and select operations for the audit table but prohibiting other operations for the audit table.

22. The machine-readable medium of claim 21, further comprising preventing creation of more than one audit table having a same name and schema.

23. The machine-readable medium of claim 20, wherein storing the audit record in the audit table further comprises:

determining whether the audit table is full; and in response to determining the audit table is full, archiving a plurality of records of the audit table and deleting the archived audit records.

24. The machine-readable medium of claim 23, wherein the plurality of records comprises a predetermined number of records.

25. The machine-readable medium of claim 23, wherein the plurality of records comprises a plurality of consecutive records including an oldest record.

26. The machine-readable medium of claim 20, wherein storing the audit record in the audit table further comprises:

determining whether the audit table is full; and in response to determining the audit table is full, overwriting an oldest record in the audit table.

27. The machine-readable medium of claim 26, further comprising maintaining the overwritten oldest record in a redo format in a redo log archive of the database.

* * * * *